United States Patent
Fontaine et al.

(10) Patent No.: US 12,359,643 B2
(45) Date of Patent: Jul. 15, 2025

(54) STRUCTURE FOR ASSEMBLING A PIECE COMPRISING A FIRST METAL PART AND A SECOND PART MADE OF AN ORGANIC MATRIX COMPOSITE MATERIAL

(71) Applicant: ARIANEGROUP SAS, Les Mureaux (FR)

(72) Inventors: Arnaud Fontaine, Les Mureaux (FR); Alban Du Tertre, Les Mureaux (FR); Didier Guichard, Les Mureaux (FR)

(73) Assignee: ARIANEGROUP SAS, Les Mureaux (FR)

( * ) Notice: Subject to any disclaimer, the term of this patent is extended or adjusted under 35 U.S.C. 154(b) by 435 days.

(21) Appl. No.: 17/999,319

(22) PCT Filed: May 11, 2021

(86) PCT No.: PCT/FR2021/050812
§ 371 (c)(1),
(2) Date: Nov. 18, 2022

(87) PCT Pub. No.: WO2021/234245
PCT Pub. Date: Nov. 25, 2021

(65) Prior Publication Data
US 2023/0184198 A1    Jun. 15, 2023

(30) Foreign Application Priority Data

May 20, 2020   (FR) ........................................ 2005274

(51) Int. Cl.
*F02K 9/97*       (2006.01)
*B33Y 80/00*      (2015.01)
(Continued)

(52) U.S. Cl.
CPC ................ *F02K 9/97* (2013.01); *B33Y 80/00* (2014.12); *B22F 10/25* (2021.01); *B33Y 10/00* (2014.12)

(58) Field of Classification Search
None
See application file for complete search history.

(56) References Cited

U.S. PATENT DOCUMENTS 5,160,392 A * 11/1992 Thongs, Jr. ............ B29C 70/86
                                                 156/175
5,570,573 A     11/1996 Bonnelie
(Continued)

FOREIGN PATENT DOCUMENTS

DE    102018109196 A1   10/2018
EP        3159525 A1     4/2017
FR        2668216 A1     4/1992

OTHER PUBLICATIONS

International Search Report with English Translation and Written Opinion issued in International Application No. PCT/FR2021/050812 on Aug. 18, 2021 (11 pages).

*Primary Examiner* — Yan Lan
(74) *Attorney, Agent, or Firm* — Bookoff McAndrews, PLLC

(57) ABSTRACT

The invention relates to a piece comprising a first metal part and a second part made of an organic matrix composite material, in which the first part has a first connecting portion and the second part has a second connecting portion, the second connecting portion having at least one blind hole, the second connecting portion being totally or partially sandwiched between the first connecting portion and a metal fastening element, the fastening element being fastened to the first part on a portion other than the first connecting (Continued)

portion and extending into the at least one blind hole, whereby the first part and the second part are fastened to one another.

10 Claims, 3 Drawing Sheets

(51) Int. Cl.
*F02K 9/34* (2006.01)
*F02K 9/62* (2006.01)
*B22F 10/25* (2021.01)
*B33Y 10/00* (2015.01)

(56) References Cited

U.S. PATENT DOCUMENTS

| | | | |
|---|---|---|---|
| 6,889,496 B2 * | 5/2005 | Beyer | F02K 9/64 |
| | | | 29/890.01 |
| 8,250,725 B2 * | 8/2012 | Sigler | B29C 65/44 |
| | | | 29/447 |
| 9,909,605 B2 * | 3/2018 | Baker | B29C 66/8322 |
| 11,472,124 B2 * | 10/2022 | Mayer | B29C 66/9292 |
| 2009/0278371 A1 | 11/2009 | Fuchs et al. | |
| 2013/0021990 A1 * | 1/2013 | Roessel | H04L 5/0066 |
| | | | 370/329 |
| 2016/0362144 A1 * | 12/2016 | Potthast | B23K 31/02 |

* cited by examiner

[Fig. 1]
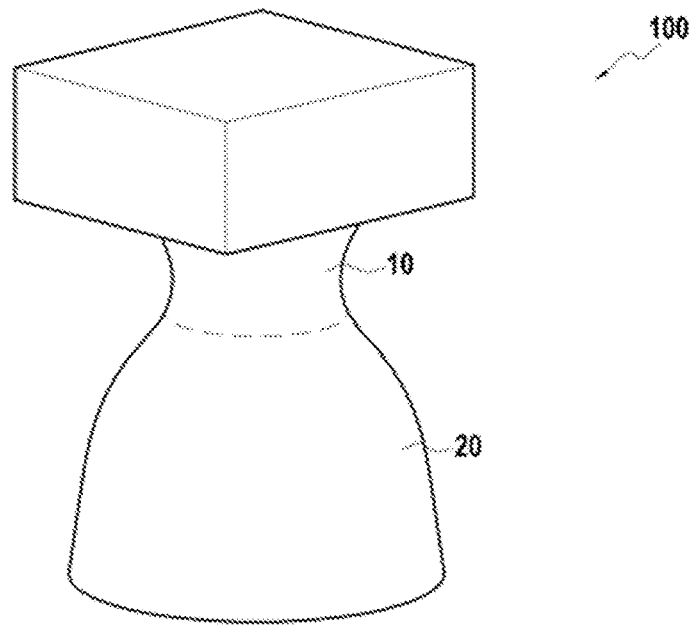
[Fig. 2]
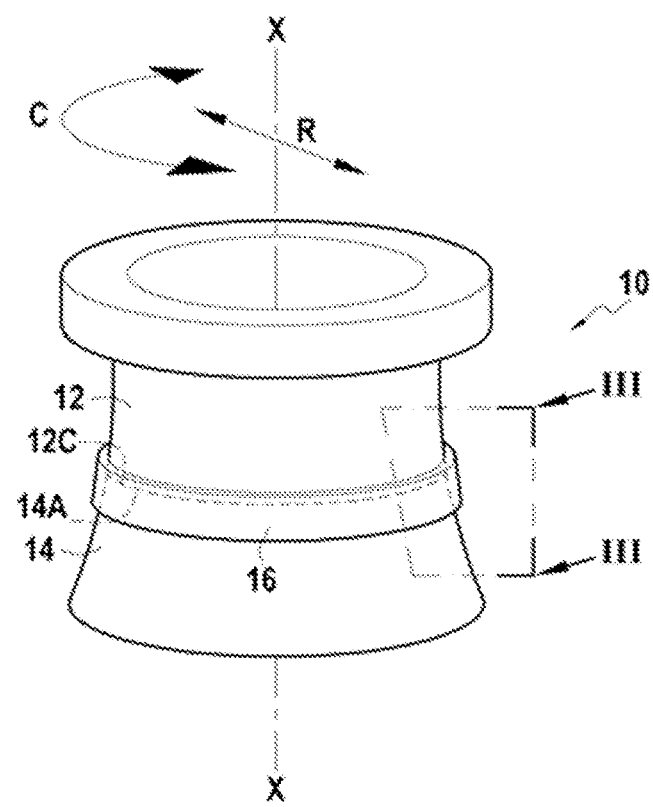

[Fig. 3]
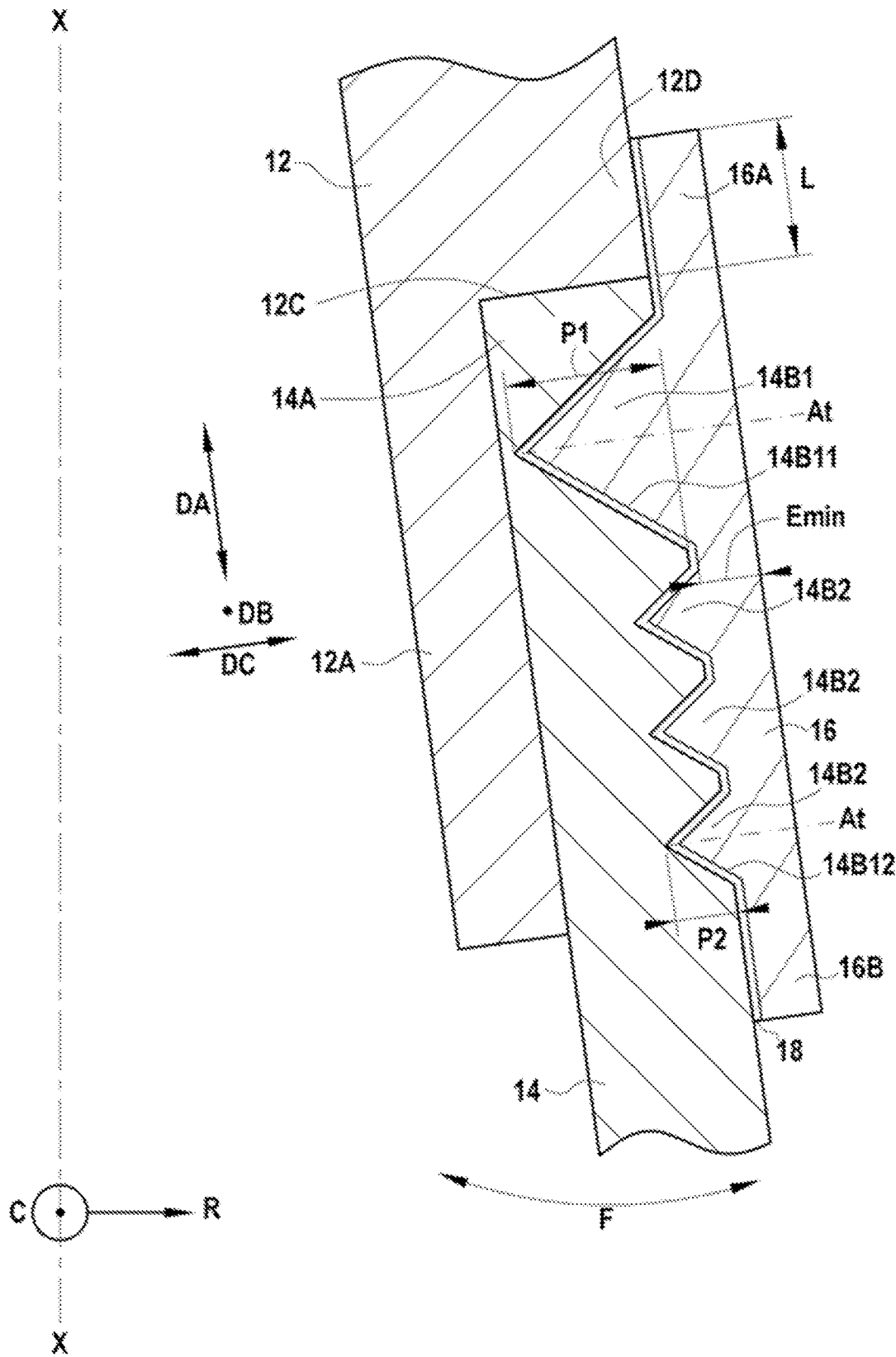

[Fig. 4]
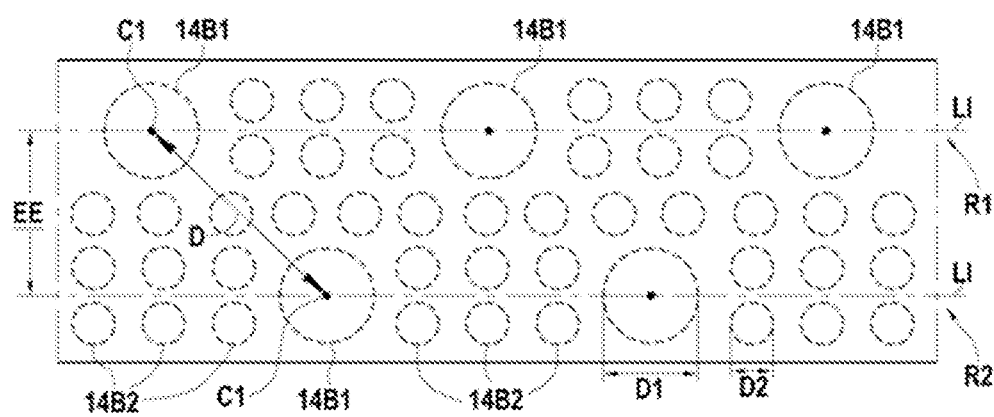

STRUCTURE FOR ASSEMBLING A PIECE COMPRISING A FIRST METAL PART AND A SECOND PART MADE OF AN ORGANIC MATRIX COMPOSITE MATERIAL

CROSS-REFERENCE TO RELATED APPLICATION(S)

This patent application is a U.S. National Stage entry of International Application No. PCT/FR2021/050812, filed on May 11, 2021, which claims priority to French Application No. 2005274, filed on May 20, 2020

TECHNICAL FIELD

The present disclosure relates to a piece comprising a metal part and a part made of organic matrix composite material assembled together. For example, such a piece may be, but is not limited to, a rocket engine combustion chamber jacket.

PRIOR ART

Pieces are known which comprise a metal part and a part made of organic matrix composite material assembled together. However, the assembly of these two parts is very often improvable and, for example, not always suitable for a component such as a rocket engine combustion chamber jacket. A need therefore exists in this context.

DISCLOSURE OF THE INVENTION

An embodiment relates to a piece comprising a first metal part and a second part made of an organic matrix composite material, in which the first part has a first connecting portion and the second part has a second connecting portion, the second connecting portion having at least one blind hole, the second connecting portion being totally or partially sandwiched between the first connecting portion and a metal fastening element, the fastening element being fastened to the first part on a portion other than the first connecting portion and extending into the at least one blind hole, whereby the first part and the second part are fastened to one another.

It is understood that the connecting portion of one part is the portion which is in contact and cooperates directly with the other part. Hence, a portion of a part which does not cooperate with the other part, for example which is not superposed with, or does not overlap, the connecting portion of the other part, is not part of the connecting portion of said part.

It is also understood that the second connecting portion has one or more blind holes. In the following, and unless indicated otherwise, "the blind hole or "the hole" shall mean "the at least one blind hole".

For example the fastening element can be, but is not necessarily, made a grade of metal identical to that of the first part.

The fastening element is fastened to the first part by enclosing at least one part of the second connecting portion. Hence, the second connecting portion is immobilised between the first connecting portion and the fastening element.

The fastening element is fastened directly to the first part over a portion other than the first connecting portion. Furthermore, the fastening element has a projection which engages in and totally or partially fills the blind hole. This projection forms a lug for immobilising and holding the second connecting portion. The second connecting portion is thus sandwiched between the first connecting portion and the fastening element, and immobilised within the sandwich by the projection of the fastening element, which is itself directly fastened on the first part.

Compared to the pieces known from the prior art, such an assembly structure can multiply the areas for absorbing forces on the fastening element and therefore better distribute the mechanical forces undergone. Furthermore, by totally or partially sandwiching the second connecting portion, the sandwiched part of the second connecting portion between the first part and the fastening element is entirely immobilised, in particular against bending. This has the effect of stiffening and mechanically reinforcing the assembly structure according to the present disclosure, compared to pieces known from the prior art. In particular, by reducing bending deformations, the pull-out stresses undergone by the fastening element are reduced.

For example, the parts can be flat or curved plates, and the fastening portions form flat or curved flanges.

For example, the first part and the second part each form a plate extending in a first direction and in a second direction, and having a thickness in a third direction perpendicular to the first and second direction, the first part and the second part being arranged side-by-side in the first direction, the at least one blind hole extending in the third direction, the first and second connecting portion overlapping one another in the first and the second direction, the fastening element and the first connecting portion being respectively arranged on either side of the second connecting portion in the third direction. The first and/or the second direction can be straight or curved, for example in a manner similar or comparable to the directions defined in a Cartesian, cylindrical or spherical coordinate system.

In certain embodiments, the at least one blind hole has an inlet, a bottom, a side wall extending between the inlet and the bottom and a geometrical axis, the side wall of said at least one blind hole being inclined relative to the geometric axis so as to converge from the inlet towards the bottom.

In other words, the side wall of the blind hole has at least one portion inclined relative to the geometric axis of the blind hole, and oriented so as to be opposite the fastening element. This enables the cooperating surface between the fastening element and the second connecting portion to be increased, whereby the forces are better distributed. Furthermore, such a configuration is particularly suitable when the fastening element is formed by cold additive metal deposition. For example, such a hole forms a conical or frustoconical hole converging from the inlet towards the bottom.

In certain embodiments, the piece has at least two rows of blind holes, the holes of each row being staggered relative to the blind holes of the adjacent row or rows.

It is understood that the holes of a first row are offset relative to the holes of a second row adjacent to the first row, in the direction of alignment of the holes within a same row. In other words, the holes of a first row are opposite the spacing between two holes of a second row adjacent to the first row, considered in a direction perpendicular to the direction of alignment of the holes within a same row.

Such a staggered arrangement makes it possible to increase the number of holes per unit surface area, while ensuring a minimum spacing between the holes so as to preserve the mechanical and structural integrity of the second connecting portion, in particular when absorbing shear stresses.

In certain embodiments, at least one first blind hole has a first depth, and at least one second blind hole has a second depth, the second depth being smaller than the first depth.

It is understood that the second connecting portion can have one or more first blind holes, one or more second blind holes and, optionally, one or more third, fourth etc. blind holes, the third, fourth, etc. blind holes respectively having a third, fourth, etc. depth different from one another and different from the first and second depth. In the following, and unless indicated otherwise, "the first/second/etc. hole" shall mean "the at least one first/second/etc. blind hole".

It is understood that the depth extends along the geometric axis of the hole, or in the third direction mentioned above by way of example.

The presence of holes having different depths makes it possible to configure these holes for different main functions. For example, the deeper first hole is configured to mainly absorb shear forces between the second connecting portion and the fastening element, while the less deep second hole is mainly configured to ensure the adherence between the fastening element and the second connecting portion.

In certain embodiments, the piece has a plurality of first blind holes, the first holes all having the same first maximum diameter, the centres of adjacent first blind holes being at a distance from one another of at least twice the first maximum diameter.

Such a distribution ensures the mechanical and structural integrity of the second connecting portion, in particular during the absorption of shear forces.

In certain embodiments, the part has a plurality of second blind holes all having the same second maximum diameter, less than the first maximum diameter, the first depth being at least two times greater, for example three times greater, than the second depth, the second blind holes being arranged between the first blind holes.

A maximum diameter is the largest diameter of the hole along the geometric axis of the hole. For example, for a hole with strictly circular cylindrical shape, the diameter is constant along the geometric axis of the hole so that the maximum diameter is equal to this constant diameter. According to another example, for a conical or frustoconical hole converging towards the bottom, the maximum diameter along the geometric axis of the hole is the diameter at the inlet of the hole.

The second holes not having the main function of absorbing shear forces, one or more second holes can be arranged between two adjacent first holes without any risk to the mechanical and structural integrity of the second connecting portion, particular during the absorption of shear forces. This makes it possible, furthermore, to improve the adherence between the second connecting portion and the fastening element.

In certain embodiments, the first blind holes are arranged in rows and staggered, the first blind holes all having the same first maximum diameter, the spacing between two adjacent rows of first blind holes being less than or equal to two first maximum diameters, the spacing being measured between the lines of each adjacent row where the centres of the first blind holes are arranged.

Such a distribution ensures the mechanical and structural integrity of the second connecting portion, in particular during the absorption of shear forces. For example, within such a configuration, the centres of adjacent first blind holes can be at a distance from one another of at least twice the first maximum diameter.

In certain embodiments, the first part and the second part each form a plate extending in a first direction and in a second direction, and having a thickness in a third direction perpendicular to the first and second direction, the first part and the second part being arranged side-by-side in the first direction, the at least one blind hole extending in the third direction, the fastening element has a first fastening portion extending only over the portion of the first part other than the first connecting portion, said first fastening portion having a width measured in the first direction, and a second fastening portion extending only over the second connecting portion, the second fastening portion having a thickness measured in the third direction, the minimum value of the width being greater than or equal to the minimum value of the thickness and less than or equal to three times the minimum value of the thickness.

Such a configuration of the fastening element ensures its mechanical and structural strength, in particular during the absorbing of various forces.

In certain embodiments, the first connecting portion comprises a shoulder configured to cooperate with the second connecting portion.

The shoulder provides an additional cooperation surface between the first and the second part, and reinforces the solidity of the assembly. For example, the first portion forms a step defining a shoulder. For example, the shoulder extends in the second and third direction.

In certain embodiments, the fastening element is formed by additive manufacturing through spray deposition of metal powder entrained by a cold gas, also known as cold gas spraying (CGS).

It is understood that additive manufacturing through spray deposition of metal powder entrained by a cold gas is a type of additive manufacturing where the metal is deposited at a temperature less than its melting temperature. Such a type of deposition is particularly suitable for the piece because it ensures that the temperature of the metal during the deposition remains less than the deterioration temperature of the organic matrix composite material of the second part.

Such a fastening element is particularly easy to manufacture, makes it possible to dispense with the welding or bolting steps of the prior art, and thus has a relatively reduced mass.

In certain embodiments, a protective layer is arranged between the fastening element and the second connecting portion.

Such a protective layer can protect the second connecting portion and, in particular, the side wall of the hole, for example when the fastening element is formed by additive manufacturing through spray deposition of metal powder entrained by a cold gas. This can ensure the mechanical integrity of the second connecting portion, and therefore ensure the mechanical strength of the assembly. For example, the protective layer can also extend over the entire interface between the second part and the fastening element.

In certain embodiments, the piece has a general shape with rotational symmetry.

The assembly structure according to the present disclosure is particularly suited to annular pieces.

In certain embodiments, the piece forms a rocket engine combustion chamber jacket.

The assembly structure according to the present disclosure is particularly well-suited for a rocket engine combustion chamber jacket.

An embodiment also relates to a rocket engine comprising a piece according to any of the embodiments described in the present disclosure and, in particular, a combustion chamber jacket according to any one of the embodiments described in the present disclosure.

BRIEF DESCRIPTION OF THE FIGURES

The object of the present disclosure and its advantages will be better understood on reading the following detailed description of various embodiments presented by way of non-limiting examples. This description refers to the attached pages of figures, in which:

FIG. 1 shows a rocket engine,

FIG. 2 shows the jacket of the combustion chamber of the rocket engine of the FIG. 1, FIG. 3 shows the assembly structure between a metal part and a part made of organic matrix composite material of the jacket of the combustion chamber, seen in the sectional plane III of FIG. 2, and FIG. 4 shows an expanded view of the blind holes of the second connecting portion.

DESCRIPTION OF THE EMBODIMENTS

For clarity of the present disclosure, it is noted that the views of FIGS. 1 to 4 are very schematic. FIG. 1 shows a rocket engine 100 comprising a combustion chamber jacket 10 opening onto an exhaust nozzle 20. FIG. 2 shows the combustion chamber jacket 10, comprising a first metal part 12, a second part made of organic matrix composite material 14 and a fastening element 16 for fastening the first part 12 to the second part 14. In this example, there is just one fastening element 16, which forms an annular flange. According to another example, there may be a plurality of distinct fastening elements 16, each forming an annular flange portion, for example. In this example, the combustion chamber jacket 10 is a piece having a part with a general shape with rotational symmetry about the axis X, the first part 12 and the second part 14 each substantially having a general shape of annular plates. In general, in this example, the axial direction corresponds to the direction of the geometric axis X of the piece 10, and a radial direction R is a direction perpendicular to the axis X. The azimuthal or circumferential direction C corresponds to the direction describing a ring around the axial direction X. The three directions, axial, radial and azimuth respectively correspond to the directions defined by the height, radius and angle in a cylindrical coordinate system.

The first and second parts 12 and 14 form plates extending in a first direction DA (in this example, the first direction is inclined relative to the axial direction X) and in a second direction DB (in this example, the second direction DB being parallel to the circumferential direction C), and has a thickness in a third direction DC, perpendicular to the first and second direction DA and DB. In this example, the DA, DB and DC reference frame forms a local reference frame in the X, C, R reference frame.

In this example, the first part 12 is made of metal alloy, for example nickel-based alloy, the second part 14 is made of organic matrix composite material, for example of the thermoplastic or thermosetting type, and the fastening element 16 is made of steel or nickel-based metal alloy. Other materials are possible.

FIG. 3 shows a sectional view in the plane III of FIG. 2 of the assembly structure of the first part 12 with the second part 14 using the fastening element 16. FIG. 4 shows an exploded view of the second connecting portion 14A of the second part 14.

The first part 12 comprises a first connecting portion 12A having a shoulder 12C. The shoulder 12C extends transversely to the first direction DA. In other words, in this example, the shoulder 12C extends in the second direction DB and the third direction DC. The first connecting portion 12A thus forms a step receiving a second connecting portion 14A described below of the second part 14, the second part 14 cooperating in abutment in the axial direction X (and in the first direction DA) with the shoulder 12C. The first part 12 and the second part 14 are arranged side-by-side in the first direction DA.

The second part 14 has a second connecting portion 14A having a plurality of blind holes, in this example several first blind holes 14B1 and several second blind holes 14B2 (see also FIG. 4).

Each hole 14B1 and 14B2 has a geometric axis At, which extends in third direction DC, and respectively has a side wall 14B11, 14B21. In this example, the holes 14B1 and 14B2 are conical in shape, the side wall 14B11, 14B21 being uniformly inclined relative to the axis At, converging from the fastening element 16 (or the inlet of the hole) towards the first connecting portion 12A (or the bottom of the hole). Of course, any other form of blind hole is possible.

In this example, the first holes 14B1 are all identical and all have, in particular, the same maximum first diameter D1 and the same first depth P1. Similarly, in this example, the second holes 14B2 are all identical and all have, in particular, the same maximum second diameter D2 and the same first depth P2. The first depth P1 is larger than the second depth P2, in this example the first depth P1 is equal to three times the second depth P2 (i.e. P1=3×P2). The first diameter D1 is greater than the second diameter D2, in this example the first diameter D1 is equal to three times the second diameter D2 (i.e. D1=3×D2).

As can be seen in FIG. 4, the centres C1 of adjacent first holes 14B1 are distanced by a minimum distance D, in this example greater than twice the diameter D1 of the first holes 14B1, for example equal to four times the diameter D1 of the first holes 14B1.

The first holes 14B1 are arranged in rows. In this example, there are two adjacent rows R1 and R2 of first holes 14B1; within each row R1 and R2, the centres C1 of the first holes 14B1 being aligned on a line LI. The first holes 14B1 of one row are staggered relative to the first holes 14B1 of the other row. The spacing EE between the two rows R1 and R2 is less than twice diameter D1, in this example the spacing EE is equal to 1.5 times the diameter D1 (i.e. EE=1.5×D1).

The second holes 14B2 are arranged between the first holes 14B1. In this example, there are second holes 14B2 between the first holes 14B1 within a same row, and between the rows R1, R2 of first holes 14B1.

The second connecting portion 14B is equipped with a protective layer 18. More particularly, in this example the protective layer 18 extends over the entire interface of the second part 14 with the fastening piece 16. In other words, in this example the protective layer 18 extends not only over the side walls 14B11, 14B21 of the holes 14B1 and 14B2 but also over the walls of the second part 14 opposite the fastening element 16.

For example, the protective layer 18 is formed by a metal sheet, or by an additive manufacturing metal deposition by metal arc wire. In this example the metal used for the protective layer 18 is copper, but any other metal material is possible.

In this example, the fastening element 16 is formed by additive manufacturing through spray deposition of metal powder entrained by a cold gas. The protective layer 18 protects the second connecting portion 14B during the formation of the fastening element 16, in particular from possible abrasion which could result from the spraying of the metal powder.

In this example, the fastening element 16 encloses, with the first part 12, the entirety of the second connecting portion 14A, in the third direction DC. The fastening element 16 extends into the blind holes 14B1 and 14B2. The fastening element 16 is fastened to the first part 12 over a distinct portion of the first connecting portion 12A, in this example a portion 12D adjacent to the first connecting portion 12A.

The fastening element 16 has a first fastening portion 16A extending only over the portion 12D. The first fastening portion 16A has a width L measured in the first direction DA. In this example, the width L of the first fastening portion 16A is constant in the third direction DC. The fastening element 16 has a second fastening portion 16B extending only over the second connecting portion 14A. The second fastening portion 16B has a minimum thickness Emin (i.e. a minimum value of the thickness of the second fastening portion 16B), the thickness being measured in the third direction DC. In this example the minimum value of the width L is greater than the minimum thickness Emin and is less than three times the minimum thickness Emin. In this example, the minimum value of the width L is equal to twice the minimum thickness Emin (i.e. L=2×Emin).

The fastening element 16 can immobilise the second connecting portion 14A and stiffen the assembly which reduces, in particular, bending deformations F (in the radial direction R, around the circumferential direction C) of the assembly. In this example, the fastening element 16 forming an annular flange extending all over the entire circumferential direction C, can improve the reduction in bending deformations around the axial direction X of the assembly. The fastening points are therefore less stressed and their mechanical strength is reinforced.

Although the present invention has been described by referring to specific embodiments, it is obvious that modifications and changes can be made to these examples without going beyond the general scope of the invention as defined by the claims. In particular, the individual features of different embodiments illustrated or mentioned can be combined in additional embodiments. Consequently, the description and the drawings should be considered as illustrating rather than limiting.

The invention claimed is:

1. A piece comprising a first metal part and a second part made of an organic matrix composite material, in which the first part has a first connecting portion and the second part has a second connecting portion, the second connecting portion having at least one blind hole, the second connecting portion being totally or partially sandwiched between the first connecting portion and a metal fastening element, the fastening element being fastened to the first part on a portion other than the first connecting portion and extending into the at least one blind hole, whereby the first part and the second part are fastened to one another.

2. The piece according to claim 1, having at least two rows of blind holes, the blind holes of each row being staggered relative to the blind holes of the adjacent row or rows.

3. The piece according to claim 1, having at least one first blind hole having a first depth, and at least one second blind hole having a second depth, the second depth being smaller than the first depth.

4. The piece according to claim 3, having a plurality of first blind holes, the first blind holes all having the same first maximum diameter, the centres of the adjacent first blind holes being at a distance from one another of at least twice the first maximum diameter.

5. The piece according to claim 3, having a plurality of second blind holes all having the same second maximum diameter, less than the first maximum diameter, the first depth being at least two times greater, for example three times greater, than the second depth, the second blind holes being arranged between the first blind holes.

6. The piece according to claim 3, wherein the first blind holes are arranged in rows and staggered, the first blind holes all having the same first maximum diameter, the spacing between two adjacent rows of first blind holes being less than or equal to two first maximum diameters, the spacing being measured between the lines of each adjacent row where the centres of the first blind holes are arranged.

7. The piece according to claim 1, wherein the first part and the second part each form a plate extending in a first direction and in a second direction, and having a thickness in a third direction perpendicular to the first and second direction, the first part and the second part being arranged side-by-side in the first direction, the at least one blind hole extending in the third direction, the fastening element has a first fastening portion extending only over the portion of the first part other than the first connecting portion, said first fastening portion having a width measured in the first direction, and a second fastening portion extending only over the second connecting portion, the second fastening portion having a thickness measured in the third direction, the minimum value of the width being greater than or equal to the minimum value of the thickness and less than or equal to three times the minimum value of the thickness.

8. The piece according to claim 1, wherein the fastening element is formed by additive manufacturing through spray deposition of metal powder entrained by a cold gas.

9. The piece according to claim 1, comprising a protective layer arranged between the fastening element (16) and the second connecting portion.

10. The piece according to claim 1, forming a rocket engine combustion chamber jacket.

* * * * *